Patented Oct. 30, 1945

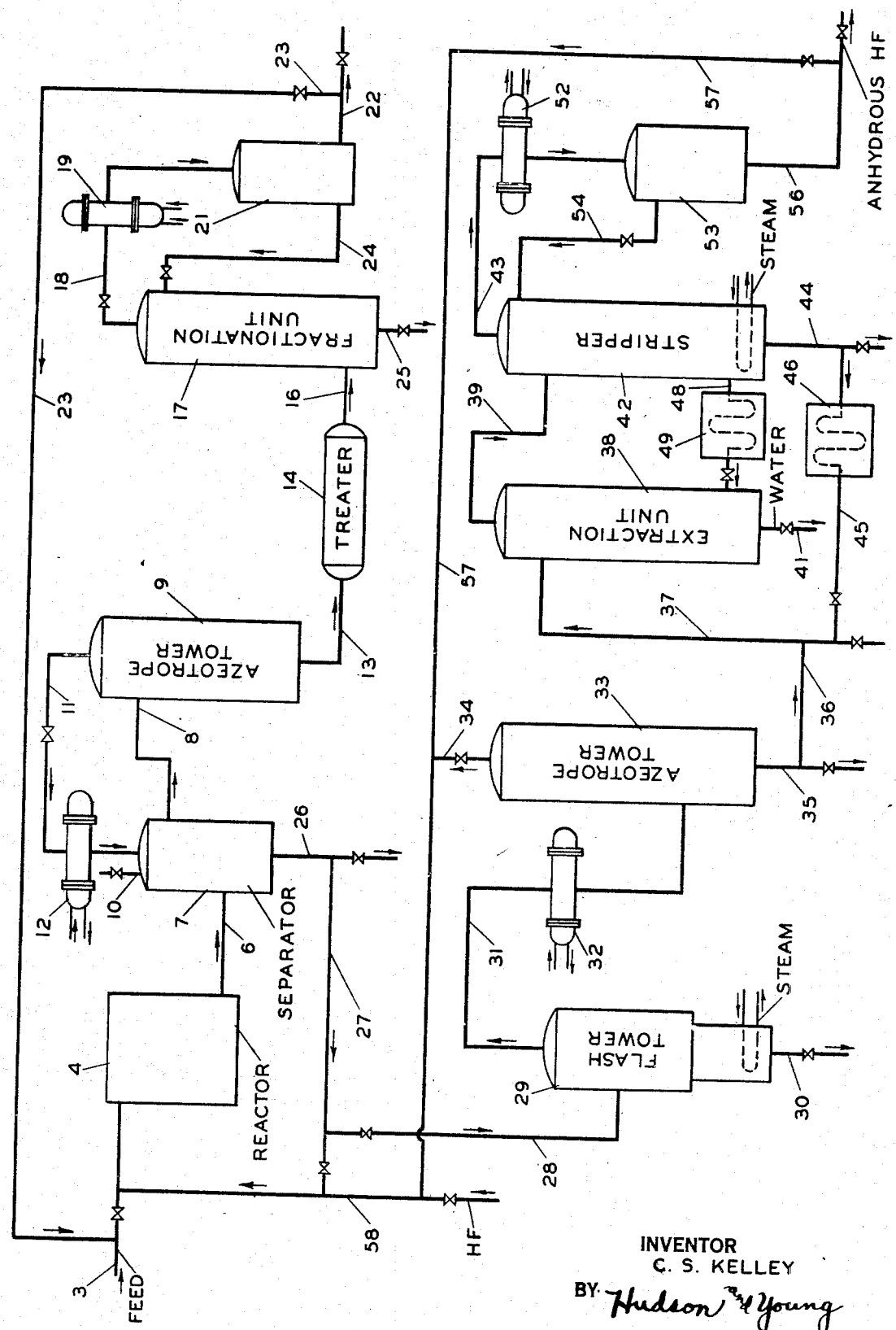

2,388,156

UNITED STATES PATENT OFFICE 2,388,156

PROCESS FOR SEGREGATION OF ANHYDROUS ACID

Carl S. Kelley, Kansas City, Kans., assignor to Phillips Petroleum Company, a corporation of Delaware Application March 1, 1945, Serial No. 580,433

12 Claims. (Cl. 260—683.4)

This invention relates to the recovery of hydrogen fluoride. More particularly in one embodiment this invention relates to the recovery of anhydrous hydrogen fluoride from an azeotropic mixture with water.

The requirement for a substantially anhydrous hydrogen fluoride has been increased in recent years because of its use in the anhydrous condition as a catalyst in promoting and economically effecting certain types of hydrocarbon conversions. For example, anhydrous or high concentrated hydrogen fluoride is used as a catalyst in the conversion of hydrocarbons by alkylation, isomerization, cracking, cyclization and aromatization; as a reactant in production of alkyl fluorides; and as a scrubbing agent for selective solvents in the removal of certain impurities from saturated hydrocarbons.

Hydrogen fluoride is manufactured at a temperature of 300° F. to 400° F. by the reaction between calcium fluoride and sulphuric acid, followed by subsequent distillation which produces a product containing some water. It is very difficult, yet essential, to free the hydrogen fluoride of water acquired during its manufacture or acquired in the course of carrying out the above indicated hydrocarbon conversions where the hydrogen fluoride continuously becomes more concentrated with water which is brought into the process with the reacting materials. The increase in the water content of the hydrogen fluoride during these conversion processes is usually caused by the tendency of the hydrogen fluoride to dissolve water contained in the hydrocarbon feeds. Water can be removed from the hydrogen fluoride by distillation and in some cases by electrolysis. It is also possible to add such chemicals as caustic soda or lime which combines with the hydrogen fluoride and subsequently the hydrogen fluoride is reliberated by a strong acid to obtain a substantially anhydrous product. These processes of freeing the hydrogen fluoride of water are, however, relatively expensive and often not reliable. For example, in the conversion of hydrocarbons in the presence of hydrogen fluoride, the hydrogen fluoride is recovered in a series of fractional distillation steps which ultimately result in the formation of an azeotropic mixture of water with a portion of the hydrogen fluoride. Because of the extreme difficulty in separating the remaining hydrogen fluoride from this azeotropic mixture, the azeotropic mixture is usually discarded with the resulting loss of the hydrogen fluoride contained therein and also with the resulting dangers to health accompanying its disposal. This azeotropic mixture, which is a maximum boiling solution, contains approximately 37 mol per cent of hydrogen fluoride.

Since in commercial processes for the conversion of hydrocarbons the loss of hydrogen fluoride is significant, a method for substantially complete recovery of highly concentrated or anhydrous hydrogen fluoride is much to be desired. Furthermore, certain concentrations of hydrogen fluoride and water are very corrosive to various type of construction materials. Consequently, a method to control and minimize the percentage of water in the hydrogen fluoride throughout a conversion process would simplify the construction of process equipment. In this respect, copper and Monel metal are substantially the only kinds of metal which can be used over a relatively large range of concentrations of water in a hydrogen fluoride, however, if the concentration of water could be maintained less than about 40 per cent throughout the process the use of steel and cast iron would be possible.

The object of this invention is to recover concentrated hydrogen fluoride from an admixture with other materials.

Another object of this invention is to recover concentrated, or anhydrous, hydrogen fluoride from an azeotropic mixture of hydrogen fluoride and water.

Still another object is to recover a substantially anhydrous hydrogen fluoride from an admixture of hydrogen fluoride with hydrocarbons.

Another object is to maintain a substantially water-free hydrogen fluoride having non-corrosive effects on steel and cast iron in hydrocarbon conversion processes.

Another object is to decrease the cost of hydrogen fluoride recovery and make-up in hydrocarbon conversion processes.

Other objects and advantages of the present invention will become apparent to those skilled in the art from the accompanying disclosure and description.

According to one specific embodiment of this invention, concentrated, or even anhydrous, hydrogen fluoride is recovered from an azeotropic mixture of hydrogen fluoride and water by contact with a liquid hydrocarbon solution containing a relatively water insoluble organic nitrogen base. When the aqueous solution or mixture containing the hydrogen fluoride contacts the liquid hydrocarbon solution containing the organic base, an organic hydrofluoride is formed. The organic hydrofluoride, which is relatively more soluble in the liquid hydrocarbon solution than in the aqueous solution, dissolves in the hydrocarbon solution and hyrogen fluoride is thereby extracted from the aqueous solution. Thereafter, the resulting liquid hydrocarbon solution containing the dissolved organic hydrofluoride is heated to a temperature sufficiently high to dissociate hydrogen fluoride from the hydrofluoride, and hydrogen fluoride thus liberated is recovered as a concentrated, and sometimes as an anhydrous, product while the liquid hydrocarbon solution and organic base are returned to the process for reuse.

Preferably, after extraction of the organic hydrofluoride from the water, the dissociation of the organic hydrofluoride to release hydrogen fluoride is accomplished by charging the resulting liquid hydrocarbon solution containing the organic base hydrofluoride and any unreacted organic base to a conventional stripping column under conditions of temperature and pressure necessary to decompose or strip the organic hydrofluoride. Hydrogen fluoride is removed as an overhead fraction from this column, and a liquid hydrocarbon solution containing the organic base is removed as a bottom fraction from the column to be recycled to the extraction process.

It has been found that suitable organic bases which are relatively insoluble in the water and relatively soluble in the hydrocarbon solution comprise primary, secondary, and tertiary amines containing more than nine carbon atoms per molecule and organic cyclic compounds containing a nitrogen atom. These cyclic compounds preferably comprise aromatic amines and heterocyclic organic compounds with a nitrogen atom in the hydrocarbon ring. Aliphatic or cyclic derivatives of these compounds may also be used, and will have smaller solubilities of both the organic base and the corresponding organic hydrofluoride in water.

The extraction of hydrogen fluoride from the water solution by a solution of a hydrocarbon solvent and an organić base is accomplished by contacting the hydrocarbon solution in the liquid phase with the water-hydrogen fluoride solution in either the liquid or vaporous phase at about atmospheric or somewhat higher temperatures. The extraction process may be carried out in either a batch or continuous process; if a continuous extraction process is used, it is preferable to pass the solutions countercurrently to each other.

The temperature of the aqueous solution in a liquid-liquid extraction, generally, should be as low as practicable for optimum extraction of the hydrogen fluoride in order to decrease the solubility, if any, of the organic base and its salt in the water solution. In many cases, therefore, the aqueous solution will be somewhat below atmospheric temperature, preferably between about 40° F. and about 60° F. However, since there are some organic bases which are more soluble in aqueous solutions of relatively low temperature than at relatively higher temperatures, it may be preferable to maintain the aqueous solution at a temperature substantially above atmospheric to minimize the solubility of the organic base and its salts in the aqueous solution. Suitable conditions in any particular instance can be readily found by simple experiments by one skilled in the art, in accordance with the present disclosure.

Where it is found particularly suitable, a liquid-vapor extraction or absorption of the hydrogen fluoride from a vapor phase mixture of water and hydrogen fluoride may be carried out with comparative ease at temperatures above about 220° F. Preferably, the hydrogen fluoride absorption is accomplished by countercurrent flow of the liquid hydrocarbon solution with a vapor phase mixture of the water and hydrogen fluoride having a superheat not more than about 50° F.

The chemical nature of the extraction step of the process in which the hydrogen fluoride is removed from the aqueous solution by the organic nitrogen base probably constitutes both absorption of the hydrogen fluoride and a chemical interaction between the organic base itself and the hydrogen fluoride. The organic salt formed in the extraction is thought to constitute an abnormal base of the type base 4HF; i. e., three titratable HF radicals and one HF radical combined as the normal salt of the base. The structure of the organic hydrofluoride formed would, therefore, indicate that a part of the hydrogen fluoride was held by absorption rather than by chemical combination. This phenomenon of the attachment of the hydrogen fluoride to the organic base is borne out by the fact that the mol per cent of hydrogen fluoride attached or combined with the organic base depends to a marked degree on the temperature of extraction. Thus, at relatively high temperatures the amount of hydrogen fluoride removed by the organic base is less than the amount removed at relatively low temperatures. For this reason it is preferable that the temperature of the hydrocarbon solution be relatively low during the extraction step of the process, preferably between about 40° F. and about 60° F., while the temperature of the hydrocarbon solution during the stripping step of the process should be relatively higher.

The stripping step of the process liberates hydrogen fluoride from the hydrocarbon solution and may be carried out in a conventional stripping column. The temperature of the hydrocarbon solution in the stripping column, depending on the pressure therein, is relatively higher than the temperature of the hydrocarbon solution during the extraction step. By properly adjusting the temperatures of the hydrocarbon solution between the extraction step and stripping step actual decomposition or dissociation of the organic base hydrofluoride to free the chemically combined hydrogen fluoride may be unnecessary since sufficient absorbed hydrogen fluoride will be liberated by the change in temperature or pressure. Removal of hydrogen fluoride in this manner permits the use of relatively lower temperatures in the stripping process than would be required to actually decompose the organic base monohydrofluoride, resulting in decreased costs of operation and risks of loss of materials by decomposition, etc. Furthermore, by properly adjusting the temperatures and pressures in the extraction and stripping steps the ratio of hydrogen fluoride recovered to the quantity of organic base used is easily controlled. Temperatures between about 250° F. and about 550° F., with the corresponding pressure required to maintain the organic base and hydrocarbon solvent in the liquid phase, are suitable to decompose or strip the hydrofluoride to liberate hydrogen fluoride therefrom, however, it may be preferable to use other temperatures than within this range since ultimately the required temperature for decomposition or stripping depends upon the thermal stability of the organic hydrofluoride and the bubble point temperatures of the hydrocarbon mixture in the stripping column.

The hydrocarbon material itself used to dissolve the organic base also functions as a solvent for the extraction of the organic base hydrofluoride formed from the aqueous solution. Generally, the organic base hydrofluoride may be somewhat soluble in the aqueous solution but it will be more soluble in the hydrocarbon solvent enabling a substantially complete removal of it by extraction from the aqueous solution.

Some organic nitrogen compounds, such as pyrrole and its derivatives, are hydrolized so completely in aqueous solutions that neither the basic or acidic properties are evident. However, in hydrocarbon solutions the basic properties of the organic nitrogen compounds becomes more evident than the acidic properties. Thus, by dissolving the organic nitrogen compound in a hydrocarbon solvent and subsequently contacting the resulting solution with the aqueous solution according to this invention, hydrolysis of the organic compound is decreased sufficiently to assure the prevalence of its basic properties and its interaction with the hydrogen fluoride. In this manner the hydrocarbon solvent for the organic base also serves to bring about more completely the chemical union of the organic base and the hydrogen fluoride, if it is so desired, as well as a means of extracting the organic hydrofluoride from the aqueous solution.

Preferably, the organic nitrogen compound should be relatively insoluble in water, however, relatively soluble compounds may be used without departing from the scope of this invention. The organic nitrogen compound should also possess basic properties either in the aqueous solution or the hydrocarbon solution as previously discussed, and preferably should be of the type which will readily react with or absorb the hydrogen fluoride.

The organic nitrogen bases which have been found capable of removing the hydrogen fluoride include aliphatic amines, aromatic amines, and heterocyclic compounds containing a nitrogen in the ring. It has been further found that the primary aliphatic amines containing more than nine carbon atoms per molecule are most suitable since these compounds are substantially insoluble in water but, nevertheless, react readily with the hydrogen fluoride in the aqueous solution. Saturated and unsaturated heterocyclic compounds containing only nitrogen in the ring and having aliphatic and alicyclic hydrocarbon substitutions to control the solubility in water have also been found to be suitable to extract the hydrogen fluoride from its water solution.

These organic bases are relatively stable at substantially high temperatures and do not themselves decompose at the temperatures used in the stripping step of the present invention.

Aliphatic and alicyclic amines having more than nine carbon atoms per molecule and less than about 24 carbon atoms per molecule form relatively water insoluble hydrofluorides when they combine with hydrogen fluoride, while on the other hand, the hydrofluorides formed are relatively soluble in the hydrocarbon solvent.

Primary amines are relatively strong bases having a basicity similar to ammonia, while secondary and tertiary amines are relatively less basic and consequently somewhat less desirable for use in this invention. Aromatic amines are weaker bases than aliphatic amines but resemble the aliphatic amines in other respects. In general, therefore, aromatic amines are also suitable for the extraction of the hydrogen fluoride from an aqueous solution.

Of the heterocyclic compounds, the members having six or more carbon atoms per molecule and usually less than about 24 carbon atoms per molecule are preferred.

Heterocyclic carbon compounds having only a nitrogen atom in the ring have the required basic properties for use in the present invention, and, in general, form the corresponding organic hydrofluoride on interaction with hydrogen fluoride. These heterocyclic compounds are relatively stable and do not themselves decompose at the temperature required to free the hydrogen fluoride from the organic hydrofluoride in the stripping step of the process. Heterocyclic compounds suitable for use in the present invention are limited primarily to those carbon compounds which have only nitrogen itself as the heterogeneous element within the molecule. Thus, it is preferable to use those organic nitrogen compounds containing no oxygen, sulfur or like elements.

Compounds which have been found particularly satisfactory and preferable for extracting the hydrogen fluoride from a water solution include tributyl amine, triamyl amine, hexadecyl amine, benzyl amine, benzyl aniline, aniline, acridine, carbazole, indole, piperidine, picoline, pyridazine, quinoline, quinaldine, and toluidine. These are, however, only a few of the many organic nitrogen compounds which may be used with satisfactory results, and the invention is not limited to the use of these particular compounds.

The hydrocarbon material to be used as the solvent for the organic nitrogen base may comprise any suitable organic solvent or petroleum fraction, such as naphtha, gas oil, kerosene, and petroleum distillate. The hydrocarbon solvent should be relatively insoluble in water but miscible with the organic base.

The accompanying drawing is a diagrammatic illustration of apparatus in which an embodiment of the present invention may be carried out when applied to the alkylation of isobutane with olefins in the presence of hydrogen fluoride as the catalyst. A suitable and typical feed stock for hydrogen fluoride alkylation appears in the table below:

| Component | Mol percent |
|---|---|
| Isobutane | 68 |
| Isobutylene | 8 |
| Normal butylene | 13 |
| Butane | 10 |
| Other hydrocarbons | 1 |
| | 100 |

The overall mol ratio of isoparaffin to olefin is usually from 4:1 to 20:1 in the combined feed and recycle, and much higher in the reaction zone. The time of residence of the reaction mixture in the reactor 4 is usually from about 5 to about 15 minutes, but it may be shorter or longer as desired. The volume ratio of acid to hydrocarbon is between approximately 0.5:1 and 2:1, generally about 1:1; although other ratios may be maintained. The hydrocarbon feed stock enters the alkylation process through line 3 and passes to reactor 4 as a liquid at a temperature of about 50° F. to about 125° F. and a pressure of about 25 to about 100 pounds per square inch gage. Should it be desired, however, both higher pressures and higher temperatures may be used. In general, only sufficient pressure to assure liquid phase operation is necessary.

From reactor 4, a hydrocarbon conversion effluent is passed by line 6 to separator 7 in which the effluent separates into two liquid phases, a lighter liquid hydrocarbon phase and a heavier liquid hydrogen fluoride phase. The hydrogen fluoride phase is withdrawn from the bottom of separator 7 through line 26 to be recycled as a catalyst for the alkylation reaction by passing from line 26 through line 27 to line 58 and thence to reactor 4. It may be desirable to remove water from the hydrogen fluoride and for this purpose a portion of all of the hydrogen fluoride is passed through a purification system, the operation of which will be discussed completely hereinafter.

The liquid hydrocarbon phase passes from separator 7 to azeotrope tower 9 by line 8. Separation of an azeotropic mixture of hydrocarbons and hydrogen fluoride from the hydrocarbon phase is effected in tower 9. This azeotropic mixture passes as a vapor from tower 9 through line 11 and condenser 12 to separator 7. A liquid hydrocarbon stream, substantially free from hydrogen fluoride but containing small amounts of organic fluorine compounds, passes from the bottom of tower 9 through line 13 to treater 14. These organic fluorine compounds, which are formed as by-products of the hydrocarbon conversion, are removed by treatment with a suitable agent, such as bauxite or alumina, in treater 14.

The liquid hydrocarbon stream, now substantially free from organic fluorine compounds, passes to fractionation unit 17 which may represent either a single deisobutanizer or a series of fractionators for the separation of various components of the hydrocarbon conversion effluent. This liquid hydrocarbon stream which constitutes the hydrocarbon conversion effluent has approximately the following composition at this point in the process.

| Hydrocarbon component | Mol percent |
| --- | --- |
| Propane and lighter hydrocarbons | 0.4 |
| Isobutane | 53.4 |
| Normal butane | 31.2 |
| Alkylate | 15.0 |
| | 100.0 |

In case fractionator 17 is a deisobutanizer, normal butane and heavier hydrocarbons are separated from isobutane and lighter hydrocarbons therein. The overhead fraction containing the isobutane and lighter hydrocarbons is passed by line 18 and through condenser 19 to accumulator 21. A portion of the condensed overhead fraction is recycled to fractionator 17 through line 24 as a liquid reflux.

The isobutane may be separated from the lighter hydrocarbons through further treatment (not shown) or a portion or all of the overhead product after condensation may be recycled from accumulator 21 to reactor 4 by line 23, particularly when the proportion of propane and lighter hydrocarbons is relatively so small that the pressure limitations of the subsequent separator is not exceeded unrecycled condensate may be withdrawn through line 22.

Butanes and heavier hydrocarbons, including the alkylation products, are withdrawn from fractionator 17 by line 25 and are conveyed to subsequent fractionators (not shown) for separation of the alkylation products from the butanes and other materials as desired.

Line 10 on separator 7 is a vent for the removal of propane and lighter hydrocarbons from the system and serves also to maintain the required pressure limitations on the process equipment.

The hydrogen fluoride phase from separator 7 will accumulate sufficient water because of its continuous recycle to reactor 4 to decrease the catalytic activity of the hydrogen fluoride and also to acquire corrosive characteristics toward the iron or steel process equipment which it contacts. It is, therefore, desirable to remove water from at least a portion of the hydrogen fluoride before it is recycled to reactor 4. All or a portion of the hydrogen fluoride phase from separator 7 is passed to flash tower 29 via lines 26, 27, and 28 as the first step in recovery of anhydrous or more highly concentrated, hydrogen fluoride.

Flash tower 29 effects a separation of the hydrogen fluoride phase from separator 7 into a purified hydrogen fluoride fraction, which is taken overhead through line 31 and condenser 32 to azeotrope tower 33; and a hydrocarbon fraction, consisting essentially of heavy polymers and alkylates contaminating the hydrogen fluoride phase, the latter fraction being withdrawn from the bottom of flash tower 29 through line 30. A small amount of light hydrocarbons may also be carried overhead with the purified hydrogen fluoride.

In azeotrope tower 33, any water that is present in the hydrogen fluoride is removed by line 35 as a maximum boiling mixture of water and hydrogen fluoride. Anhydrous hydrogen fluoride is withdrawn overhead from azeotrope tower 33 through line 34 into line 57 after which it is recycled to reactor 4 via line 58. Make-up hydrogen fluoride may be added to the alkylation system through line 58, when necessary.

Any danger of an azeotropic mixture of hydrogen fluoride and water, which might be corrosive to the construction material, accumulating in flash tower 29 is eliminated by maintaining the top temperature of the flash tower 29 sufficiently high to assure that water is carried overhead. The azeotropic mixture referred to boils at approximately 220° F. at atmospheric pressure, and at a higher temperature under superatmospheric pressures.

In order to recover the hydrogen fluoride contained in the liquid azeotropic mixture which is removed from the bottom of azeotropic tower 33 rather than discard the mixture which would amount to a substantial economic loss of hydrogen fluoride, the mixture is passed from tower 33 through lines 35 and 36 into line 37 where it combines with a liquid hydrocarbon solution containing hexa decyl amine which is an organic nitrogen base similar in characteristics to those organic compounds previously described for use in the present invention. The composition of the hydrocarbon solution is about 75 to about 85 mol per cent hydrocarbon solvent, such as gas oil, and about 25 to about 15 mol per cent organic nitrogen base. The ratio of aqueous solution to hydrocarbon solution admixed at this point is preferably about 1 to about 75, but the ratio may vary from about 1 to 10 to about 1 to 100 with substantially complete extraction of the hydrogen fluoride occurring.

The resulting liquid mixture is passed into extracting unit 38 which may comprise a vertical column. The aqueous solution with some unextracted hydrogen fluoride passes down the column 38 and liquid water, substantially free of hydrogen fluoride, is discharged through line 41 and may be discarded. Because of the relative densities of the aqueous and hydrocarbon solutions, the liquid water will continuously flow downward and the liquid hydrocarbon solution will flow upward through column 38. A liquid hydrocarbon solution containing hydrogen fluoride in the form of the organic hydrofluoride of the base is passed to stripping unit 42 through line 39.

The aqueous solution and hydrocarbon solution are maintained at a temperature between about 40° F. and about 60° F. in the extracting unit 38 by cooling units or the like (not shown). Pressure is maintained moderately superatmospheric.

The temperature is maintained sufficiently high in stripping unit 42 to decompose or strip the organic hydrofluoride in order to liberate hydrogen fluoride. The temperature is preferably maintained between about 400° F. and about 500° F. and sufficient pressure is maintained to prevent extensive vaporization of the organic base or the hydrofluoride. In general, the pressure of the stripping unit is relatively lower than the pressure of the extracting unit to assure more complete stripping therein.

The hydrocarbon solution which contains the organic base and which is substantially free of hydrogen fluoride, is removed from the stripping unit in two streams, a liquid stream which is relatively concentrated with the organic base at the bottom of unit 42, and a liquid side stream relatively dilute with the organic base.

The concentrated stream, removed from the bottom of unit 42, passes through line 44 and 45 and through cooler 46 into line 37. Additional hydrocarbon solvent or organic base or both may be added to the system through line 37. The hydrocarbon solution is then introduced into line 37 to contact the incoming aqueous solution containing the hydrogen fluoride for the initial reaction between the organic base and the hydrogen fluoride.

The dilute side stream is removed from unit 42 by line 48 and passes through a cooler 49 and thence directly into the lower portion of extraction unit 38. Due to the relative densities of the dilute hydrocarbon solution introduced and the aqueous solution, the hydrocarbon solution flows upward in tower 38 countercurrently to the downward flowing aqueous solution. The countercurrent flow of hydrocarbon solution and water assures substantially complete removal of hydrogen fluoride from the aqueous solution by extraction. This hydrocarbon solution is removed by line 39 along with the other hydrocarbon solution entering tower 38 through line 37.

The composition of the dilute side stream removed from stripping unit 42 is approximately as follows:

| Component | Mol percent |
| --- | --- |
| Hydrocarbon solvent | 88 |
| Organic base | 12 |

The composition of the concentrated stream removed from the bottom of the stripping unit 42 is approximately as follows:

| Component | Mol percent |
| --- | --- |
| Hydrocarbon solvent | 80 |
| Organic base | 20 |

The ratio of the quantity of dilute side stream removed to that quantity of the concentrated bottom stream may vary from about 1 to 5 to about 1 to 12; preferably, however, the ratio should be about 1 to 9.

Hydrogen fluoride which has dissociated from the organic hydrofluoride is distilled overhead from stripping unit 42 and is removed therefrom by line 43. A portion of the hydrocarbon solvent or gas oil may also pass overhead. Hydrogen fluoride and any hydrocarbon solvent present pass through condenser 52 to accumulator or decanter 53. The condensed hydrocarbon solvent and condensed hydrogen fluoride separate into two liquid phases in accumulator 53; a liquid hydrocarbon phase and a heavier liquid hydrogen fluoride phase. The hydrocarbon phase is withdrawn through line 54 and returned to stripping unit 42 as a liquid reflux. The second or hydrogen fluoride phase is withdrawn from accumulator 53 through line 56 as an anhydrous hydrogen fluoride product or may be returned to the reactor 4 as a catalyst via line 57.

The hydrogen fluoride contains substantially no water and is about 99.5% pure.

Although the invention has been described with particular reference to a hydrocarbon conversion process carried out in a particular manner, various modifications and other applications will occure to those skilled in the art which may be practiced without departing from the scope of the invention.

I claim:

1. A method for the separation of hydrogen fluoride from admixture with water, which comprises contacting an aqueous mixture containing hydrogen fluoride with a liquid hydrocarbon solution containing a hydrocarbon solvent and an organic nitrogen base to form the corresponding hydrofluoride with said hydrogen fluoride, said hydrofluoride being thermally dissociatable and relatively more soluble in said hydrocarbon solution than said aqueous mixture, separating a resulting liquid hydrocarbon solution from a resulting aqueous mixture which is substantially free from hydrogen fluoride, and thermally treating said resulting liquid hydrocarbon solution under conditions such that hydrogen fluoride is dissociated therefrom as a vaporous product.

2. A method for the recovery of substantially anhydrous hydrogen fluoride from admixture with water, which comprises contacting an aqueous mixture containing hydrogen fluoride with a liquid hydrocarbon solution containing a hydrocarbon solvent and an organic nitrogen base selected from the group of organic compounds consisting of the primary aliphatic and alicyclic amines containing more than 9 and less than 24 carbon atoms per molecule, the aromatic amines, and the heterocyclic compounds with a nitrogen atom in the ring under conditions such that hydrogen fluoride is bound as a thermally dissociatable organic hydrofluoride, said hydrofluoride being relatively more soluble in said hydrocarbon solution than said aqeuous mixture, separating a resulting liquid hydrocarbon solution from a resulting aqueous mixture, heating said resulting liquid hydrocarbon solution under conditions such that anhydrous hydrogen fluoride is dissociated as a vapor from a liquid hydrocarbon solution, recovering said vaporous hydrogen fluoride as a product and condensing the same, and recycling said liquid hydrocarbon solution for contact with an aqueous mixture containing hydrogen fluoride.

3. The method according to claim 2 wherein said organic nitrogen base is hexadecyl amine.

4. The method according to claim 2 in which said organic nitrogen base is benzyl aniline.

5. The method according to claim 2 in which said organic nitrogen base is toluidine.

6. The method according to claim 2 in which said aqueous mixture is contacted with said liquid hydrocarbon solution under conditions of temperature of about 40° F. to about 60° F., and said resulting liquid hydrocarbon solution is heated to a temperature of about 250° F. to about 550° F. under sufficient pressure to maintain said hydrocarbon solution in the liquid phase.

7. The method according to claim 2 in which the contacting of said aqueous mixture and said hydrocarbon solution is effected by continuously passing said aqueous mixture in the vaporous phase countercurrently to said hydrocarbon solution in the liquid phase at a temperature above 220° F.

8. The method according to claim 2 in which said hydrocarbon solvent is a petroleum distillate.

9. The method for the recovery of hydrogen fluoride from admixture with water, which comprises binding said hydrogen fluoride by contacting said mixture with a liquid absorbent mixture comprising a hydrocarbon solvent and the association product of at least one mol of hydrogen fluoride with one mol of a liquid organic nitrogen base, said association product being capable of binding additional hydrogen fluoride and being relatively more soluble in said absorbent mixture than in water, removing water, and heating the resulting liquid hydrocarbon solution containing said association product and said thus bound hydrogen fluoride sufficiently high to liberate said bound hydrogen fluoride therefrom but insufficient to deplete said association product to a hydrogen fluoride content of substantially less than one mol of hydrogen fluoride per mol of liquid organic nitrogen base.

10. In a process for the alkylation of isobutane in the presence of hydrogen fluoride in which a hydrocarbon conversion effluent is separated into a liquid hydrocarbon phase and a liquid hydrogen fluoride phase and said liquid hydrogen fluoride phase is fractionated into an overhead fraction comprising substantially vaporous anhydrous hydrogen fluoride and a bottom fraction comprising substantially a liquid azeotropic mixture of water and hydrogen fluoride, the improvement which comprises continuously passing said liquid azeotropic mixture countercurrently to a hydrocarbon solution in an extraction zone under conditions such that said hydrogen fluoride is bound as an organic hydrofluoride and extracted by said hydrocarbon solution, said hydrocarbon solution comprising about 75 to about 92 mol percent hydrocarbon solvent and about 8 to about 25 mol per cent hexa decyl amine, the ratio of azeotropic mixture to hydrocarbon solution being about 1 to 10 to about 1 to 100, maintaining a temperature in said extraction zone of about 40° F. to about 60° F., separating a resulting liquid hydrocarbon solution containing organic hydrofluoride and a resulting aqueous mixture, passing said resulting hydrocarbon solution to a stripping zone under conditions such that vaporous anhydrous hydrogen fluoride is removed therefrom as an overhead fraction and a liquid hydrocarbon solution containing said hydrocarbon solvent and said hexa decyl amine is removed as a bottom fraction, maintaining a temperature in said stripping zone between about 400° F. to about 500° F. and sufficient pressure to prevent the vaporization of said hexa decyl amine and said hydrocarbon solvent, recycling said bottom fraction of said hydrocarbon solution to said extraction zone, and condensing said vaporous hydrogen fluoride as an anhydrous product.

11. The process for recovery of hydrogen fluoride from admixture with water, which comprises binding said hydrogen fluoride by passing a liquid hydrocarbon solution containing a hydrocarbon solvent and an organic nitrogen base countercurrently to said aqueous mixture in an extraction zone to form a dissociatable organic hydrofluoride, said organic hydrofluoride being relatively more soluble in said hydrocarbon solution than in said aqueous mixture, maintaining a temperature of about 40° F. to about 60° F. in said extraction zone, separating a resulting aqueous mixture and a resulting liquid hydrocarbon solution containing hydrocarbon solvent and organic hydrofluoride, passing said resulting liquid hydrocarbon solution to a stripping zone under conditions such that vaporous hydrogen fluoride is liberated therein, maintaining a temperature of about 250° F. to about 550° F. in said stripping zone, removing a vaporous effluent and a liquid hydrocarbon solution from said stripping zone, recycling said liquid hydrocarbon solution from said stripping zone to said extraction zone, condensing said vaporous effluent to form a liquid hydrogen fluoride phase and a liquid hydrocarbon phase which phase comprises hydrocarbon solvent vaporized from said stripping zone, passing said liquid hydrocarbon phase back to said stripping zone as a reflux, and recovering liquid hydrogen fluoride as a product of the process.

12. The process for recovery of hydrogen fluoride from admixture with water, which comprises binding said hydrogen fluoride by passing a liquid hydrocarbon solution containing a hydrocarbon solvent and an organic nitrogen base countercurrently to said aqueous mixture in an extraction zone to form a dissociatable organic hydrofluoride, said organic hydrofluoride being relatively more soluble in said hydrocarbon solution than in said aqueous mixture, separating a resulting aqueous mixture and a resulting liquid hydrocarbon solution containing hydrocarbon solvent and organic hydrofluoride, passing said resulting liquid hydrocarbon solution to a stripping zone under conditions such that vaporous hydrogen fluoride is liberated therein, removing a vaporous effluent and a liquid hydrocarbon solution from said stripping zone, recycling said liquid hydrocarbon solution from said stripping zone to said extraction zone, condensing said vaporous effluent to form a liquid hydrogen fluoride phase and a liquid hydrocarbon phase which phase comprises hydrocarbon solvent vaporized from said stripping zone, passing said liquid hydrocarbon phase back to said stripping zone as a reflux, and recovering liquid hydrogen fluoride as a product of the process.

CARL S. KELLEY.